United States Patent
Kwon et al.

(10) Patent No.: US 11,296,966 B2
(45) Date of Patent: Apr. 5, 2022

(54) SYSTEM AND METHOD FOR EFFICIENT INFORMATION COLLECTION AND DISTRIBUTION (EICD) VIA INDEPENDENT DOMINATING SETS

(71) Applicant: Rockwell Collins, Inc., Cedar Rapids, IA (US)

(72) Inventors: Tj T. Kwon, Marion, IA (US); Scott M. Hamilton, Marion, IA (US); Taunya L. Kepple, Martelle, IA (US); Wayne H. Meyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/020,231

(22) Filed: Sep. 14, 2020

(65) Prior Publication Data

US 2021/0409300 A1    Dec. 30, 2021

Related U.S. Application Data

(63) Continuation-in-part of application No. 16/987,671, filed on Aug. 7, 2020, and a continuation-in-part of
(Continued)

(51) Int. Cl.
*H04L 12/26* (2006.01)
*H04L 43/0852* (2022.01)
*H04L 43/06* (2022.01)

(52) U.S. Cl.
CPC .......... *H04L 43/0852* (2013.01); *H04L 43/06* (2013.01)

(58) Field of Classification Search
CPC .............................. H04L 43/0852; H04L 43/06
See application file for complete search history.

(56) References Cited

U.S. PATENT DOCUMENTS

| 4,399,531 A | 8/1983 | Grande et al. |
| 5,835,482 A | 11/1998 | Allen |

(Continued)

FOREIGN PATENT DOCUMENTS

| CN | 101330448 B | 12/2010 |
| CN | 101465793 B | 2/2011 |

(Continued)

OTHER PUBLICATIONS

Extended Search Report for European Application No. 21188737.7 dated Dec. 10, 2021, 8 pages.

(Continued)

*Primary Examiner* — Hassan Kizou
*Assistant Examiner* — Abdullahi Ahmed
(74) *Attorney, Agent, or Firm* — Suiter Swantz pc llo (57) ABSTRACT

A system and method for efficient collection and distribution of mission-critical information (MCI) throughout a multi-node communication network is disclosed. In embodiments, the multi-node communication network may include a clusterhead node including a communication interface and a controller. In embodiments, the controller transmits an MCI request packet to neighbor nodes of its cluster. The controller receives MCI report packets from the neighbor nodes (or a subset thereof) throughout a first time interval. The controller rebroadcasts the MCI request packet to the neighbor nodes through increasingly shorter time intervals as MCI report packets continue to be transmitted in response. When the controller determines that no MCI report packets have been transmitted during the most recent time interval, the controller generates and transmits an MCI publish packet including the MCI information collected from each neighbor node.

15 Claims, 9 Drawing Sheets

Related U.S. Application Data application No. 16/698,230, filed on Nov. 27, 2019, now Pat. No. 10,999,778.

(56) References Cited

U.S. PATENT DOCUMENTS

| | | |
|---|---|---|
| 7,242,671 B2 | 7/2007 | Li et al. |
| 7,633,921 B2 | 12/2009 | Thubert et al. |
| 7,719,989 B2 | 5/2010 | Yau |
| 7,787,450 B1 | 8/2010 | Chan et al. |
| 8,036,224 B2 | 10/2011 | Axelsson et al. |
| 8,218,550 B2 | 7/2012 | Axelsson et al. |
| 8,223,660 B2 | 7/2012 | Allan et al. |
| 8,553,560 B2 | 10/2013 | Axelsson et al. |
| 8,630,291 B2 | 1/2014 | Shaffer et al. |
| 8,717,935 B2 | 5/2014 | Lindem, III et al. |
| 8,867,427 B2 | 10/2014 | Taori et al. |
| 8,913,543 B2 | 12/2014 | Zainaldin |
| 9,179,475 B2 | 11/2015 | Koleszar et al. |
| 9,246,795 B2 | 1/2016 | Madaiah et al. |
| 9,544,162 B2 | 1/2017 | Vasseur et al. |
| 9,628,285 B2 * | 4/2017 | Csaszar ............... H04L 41/0668 |
| 10,484,837 B2 | 11/2019 | Navalekar et al. |
| 10,601,684 B2 | 3/2020 | Hashmi et al. |
| 10,965,584 B1 | 3/2021 | Kwon et al. |
| 10,979,348 B1 | 4/2021 | Kwon et al. |
| 10,999,778 B1 | 5/2021 | Kwon et al. |
| 2002/0018448 A1 | 2/2002 | Amis et al. |
| 2003/0151513 A1 | 8/2003 | Herrmann et al. |
| 2004/0246902 A1 | 12/2004 | Weinstein et al. |
| 2006/0010170 A1 | 1/2006 | Lashley et al. |
| 2006/0056421 A1 | 3/2006 | Zaki |
| 2007/0097880 A1 | 5/2007 | Rajsic |
| 2007/0109979 A1 | 5/2007 | Fu et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0310325 A1 | 12/2008 | Yang |
| 2009/0290572 A1 | 11/2009 | Gonia et al. |
| 2010/0074101 A1 | 3/2010 | Skalecki et al. |
| 2010/0074141 A1 * | 3/2010 | Nguyen ............... H04L 41/12 370/254 |
| 2011/0188378 A1 | 8/2011 | Collins et al. |
| 2013/0100942 A1 * | 4/2013 | Rudnick ............... H04B 7/2656 370/337 |
| 2013/0195017 A1 | 8/2013 | Jamadagni et al. |
| 2013/0250808 A1 | 9/2013 | Hui et al. |
| 2014/0018097 A1 * | 1/2014 | Goldstein ............... G16H 40/63 455/456.1 |
| 2014/0236483 A1 * | 8/2014 | Beaurepaire ............ G08G 1/168 701/533 |
| 2014/0258201 A1 * | 9/2014 | Finlow-Bates .......... G06N 5/02 706/46 |
| 2015/0010153 A1 * | 1/2015 | Robertson ............. H04K 3/226 380/270 |
| 2015/0222479 A1 | 8/2015 | Kim et al. |
| 2015/0296335 A1 * | 10/2015 | Joshi ................. G06Q 30/0269 455/456.3 |
| 2015/0326689 A1 * | 11/2015 | Leppanen ............. H04W 24/02 370/328 |
| 2016/0150465 A1 | 5/2016 | Jung et al. |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0302807 A1 | 10/2018 | Chen et al. |
| 2019/0098625 A1 * | 3/2019 | Johnson ................. H04B 7/026 |
| 2019/0251848 A1 | 8/2019 | Sivanesan et al. |
| 2020/0052997 A1 | 2/2020 | Ramanathan et al. |
| 2020/0092949 A1 | 3/2020 | Donepudi et al. |
| 2020/0196309 A1 * | 6/2020 | Amouris ............. H04W 72/082 |

FOREIGN PATENT DOCUMENTS

| | | |
|---|---|---|
| CN | 101686179 B | 1/2013 |
| CN | 103067286 B | 6/2016 |
| CN | 107645417 A | 1/2018 |
| DE | 102010010935 A1 | 9/2011 |
| EP | 1912392 A2 | 4/2008 |
| GB | 2568122 B | 11/2019 |
| JP | 4290684 B2 | 7/2009 |
| JP | 5164157 B2 | 3/2013 |
| KR | 1020040107702 A | 12/2004 |
| KR | 1020060078814 A | 7/2006 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |

OTHER PUBLICATIONS

Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.

* cited by examiner

SYSTEM AND METHOD FOR EFFICIENT INFORMATION COLLECTION AND DISTRIBUTION (EICD) VIA INDEPENDENT DOMINATING SETS

CROSS-REFERENCE TO RELATED APPLICATIONS

The instant application is related to and claims the benefit of the earliest available effective filing dates under 35 USC § 120 as a continuation in part of the following U. S. Patent Applications:

Ser. No. 16/987,671 entitled SYSTEM AND METHOD FOR INDEPENDENT DOMINATING SET (IDS) BASED ROUTING IN MOBILE AD HOC NETWORKS (MANET), filed Aug. 7, 2020; and Ser. No. 16/698,230 entitled SYSTEM AND METHOD FOR ADAPTIVE POSITION-LOCATION INFORMATION EXCHANGES, filed Nov. 27, 2019;

The instant application is related to, and incorporates by reference in their entirety, the following U.S. Patent Applications:

Ser. No. 16/369,398 filed Mar. 29, 2019 and entitled ZERO-OVERHEAD EFFICIENT FLOODING.

TECHNICAL FIELD

The subject matter disclosed herein is directed generally to communications networks and more particularly to mobile ad hoc network (MANET) routing.

BACKGROUND

Mobile ad-hoc networks (MANET; also referred to as, e.g., "mesh networks") are known in the art as quickly deployable, self-configuring wireless networks with no pre-defined network topology. Each communications node within a MANET is presumed to be able to move freely. Mission-critical information (MCI) is distributed frequently throughout the network as a fundamental concept of operation (CONOP) requirement. For example, each communications node of a MANET may disseminate MCI at set intervals to every other communications node of the network, which may result in excessive network congestion and overhead. Furthermore, since each communication node participates in the distribution of MCI data at regular intervals, traffic within the network may be directly proportional to the size of the network (e.g., number of communication nodes within the multi-node network). In this regard, threat receivers may be able to estimate and/or determine the size of the network by monitoring network traffic, thereby leading to security concerns.

SUMMARY

A communications node of a multi-node communications network configured for efficient collection and distribution of mission-critical information (MCI) via dominating sets is disclosed. In embodiments, the communications node includes a communications interface configured for receiving MCI request packets and a controller. If the communications node has a clusterhead node status, the communications node transmits the MCI request packet to neighbor nodes within its cluster. The communications node receives MCI reports from the neighbor nodes (e.g., from a subset of neighbor nodes) throughout a first time interval. If the communications node continues to receive MCI report packets (e.g., from unacknowledged neighbor nodes that have not already reported), the communications node continues to retransmit MCI report packets. If no MCI report packets were received during the most recent time interval, the communications node compiles and transmits an MCI publish packet incorporating the MCI received from its neighbor nodes.

In some embodiments, the communications node retransmits the MCI request packet for a number of iterations, each time interval shorter than the most recent time interval.

In some embodiments, the retransmitted MCI request packet includes a member list of acknowledged neighbor nodes, and the communications node received MCI report packets from unacknowledged neighbor nodes not included in the member list.

In some embodiments, the MCI request packet includes requesting characteristics, and the communications node receives MCI report packets from neighbor nodes fulfilling the requesting characteristics.

In some embodiments, each MCI report packet includes a unique identifier of the transmitting neighbor node, e.g., a physical or network address.

In some embodiments, the communications node is one of a dominating set of clusterhead nodes of the multi-node communications network, and the neighbor nodes are the set of neighbor nodes reporting to the clusterhead node according to the network clustering structure.

In some embodiments, the communications node includes a memory for storing a local list of the neighbor nodes.

In some embodiments, the communications node receives the MCI request packet from a source node (e.g., command post) of the multi-node communications network, and unicasts the MCI publish packet to the source node.

In some embodiments, the communications node broadcasts the MCI publish packet to its neighbor nodes according to packet flooding or broadcasting protocols.

A method for efficient collection and distribution of mission critical information (MCI), throughout a multi-node communications network is also disclosed. In embodiments, the method includes receiving, via a communications node of the network, an MCI request packet. The method includes, if the communications node is a clusterhead node, transmitting the MCI request packet to neighbor nodes of the network (e.g., of its cluster of reporting neighbor nodes). The method includes receiving, throughout a first time interval, MCI report packets from the neighbor nodes (e.g., or a subset thereof), each MCI report packet including MCI from the transmitting neighbor node. The method includes retransmitting the MCI request packet to the neighbor nodes. The method includes receiving, throughout additional time intervals, MCI report packets from additional subsets of neighbor nodes. The method includes determining that no MCI report packets were received during the most recent time interval. The method includes compiling and transmitting an MCI publish packet incorporating the MCI received from each transmitting neighbor node.

In some embodiments, the method includes receiving the MCI request packet from a source node of the network, and unicasting the MCI publish packet to the source node.

In some embodiments, the method includes transmitting the MCI publish packet to the neighbor nodes according to packet flooding or broadcasting procedures.

In some embodiments, the method includes retransmitting the MCI request packet to the neighbor nodes in multiple iterations, each successive iteration incorporating a shorter time interval, until no MCI report packets are received during the most recent time interval.

In some embodiments, the method includes retransmitting the MCI request packet with the most recently updated member list of acknowledged neighbor nodes (e.g., neighbor nodes having already transmitted an MCI report packet), and receiving subsequent MCI report packets from unacknowledged neighbor nodes not already on the member list.

In some embodiments, the method includes retransmitting the MCI request packet including requesting characteristics, and receiving MCI report packets from neighbor nodes fulfilling the requesting characteristics.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for efficiently collecting and distributing mission-critical information (MCI) throughout a mobile ad hoc network (MANET) or other like multi-node communications network. For example, U.S. patent application Ser. No. 16/698,230, which is herein incorporated by reference in its entirety, discloses the collection and distribution of position location information (PLI) via selected critical nodes of the MANET. U.S. patent application Ser. No. 16/987,671, which is also herein incorporated by reference in its entirety, discloses the use of dominating sets of critical nodes to reduce overall packet flooding with respect to link status advertisements and passive clustering of MANET nodes. Embodiments of the inventive concepts disclosed herein may reduce overhead (and similarly reduce bandwidth and potential channel interference) by eliminating the need for every node to flood or broadcast other types of MCI (including, but not limited to, dynamic spectrum allocations (DSA) or channel quality measurements). Similarly, the efficient distribution of MCI may be used for clustering or reconstruction of very large MANETs.

Figure 1:
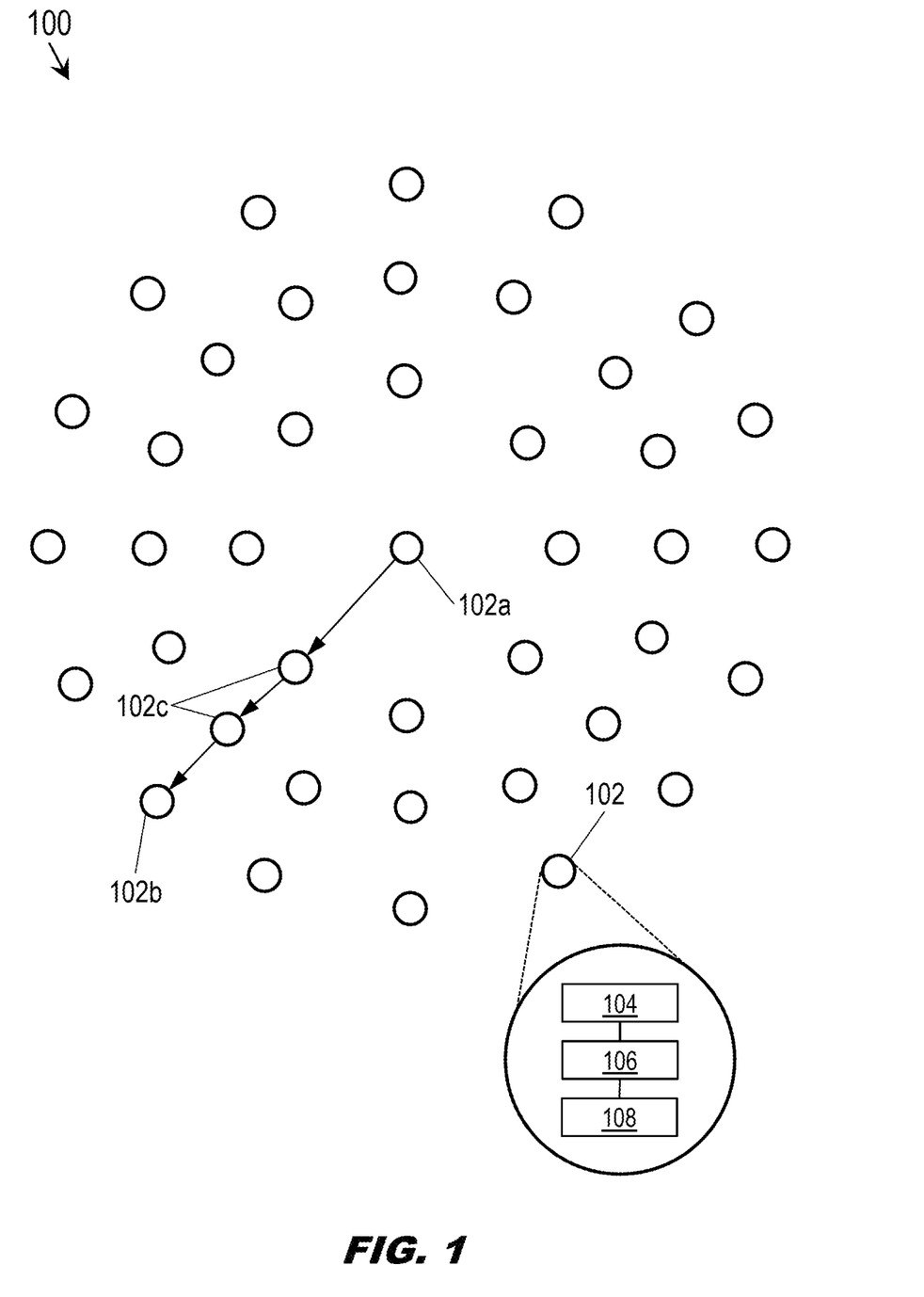
FIG. 1 is a diagrammatic illustration of a multi-node communications network according to example embodiments of this disclosure.

Referring to FIG. 1, a multi-node communications network 100 is disclosed. The multi-node communications network 100 may include communications nodes 102.

In embodiments, the multi-node communications network 100 may include any multi-node communications network known in the art. For example, the multi-node communications network 100 may include a mobile ad-hoc network (MANET) in which each communications node 102 within the multi-node communications network is able to move freely and independently. Similarly, the one or more communications nodes 102 may include any communications node known in the art which may be communicatively coupled. In this regard, the one or more communications nodes 102 may include any communications node known in the art for transmitting/transceiving data packets. For example, the one or more communications nodes 102 may include, but are not limited to, radios, mobile phones, smart phones, tablets, smart watches, laptops, and the like. In embodiments, each communications node 102 of the multi-node communications network 100 may include, but is not limited to, a respective controller 104 (e.g., control processor), memory 106, and communication interface 108.

The controller 104 provides processing functionality for at least the communications node 102 and can include any number of processors, micro-controllers, circuitry, field programmable gate array (FPGA) or other processing systems, and resident or external memory for storing data, executable code, and other information accessed or generated by the communications node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communications node 102/controller 104, such as software programs and/or code segments, or other data to instruct the controller 104, and possibly other components of the communications node 102, to perform the functionality described herein. Thus, the memory 106 can store data, such as a program of instructions for operating the communications node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communications node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communications node 102 and the controller 104. It should be noted that while the communication interface 108 is described as a component of the communications node 102, one or more components of the communication interface 108 can be implemented as external components communicatively coupled to the communications node 102 via a wired and/or wireless connection. The communications node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communications node 102 may be configured to communicatively couple to additional communication interfaces 108 of additional communications nodes 102 of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communications network 100 may determine the shortest route for transmission of a data packet between a source node 102a and a destination node 102b. For example, the source node 102a may not transmit data packets directly to the destination node 102b, but via one or more relay nodes 102c which forward the data packets to the destination node 102b.

In embodiments, the multi-node communications network 100 may, via global collaboration between its participating communications nodes 102, construct the network topology by generating an independent dominating set (IDS), or a subset of all communications nodes within the multi-node communications network. For example, under OLSR every communications node 102, 102a-c may be selected as an MPR node in the worst case (e.g., on a per-node basis without global collaboration), resulting in excessive routing overhead (e.g., due to every MPR node transmitting link status advertisements (LSA)) and/or bandwidth requirements (e.g., due to excessive hello messaging incorporating two-hop neighbor lists).

Figure 2:
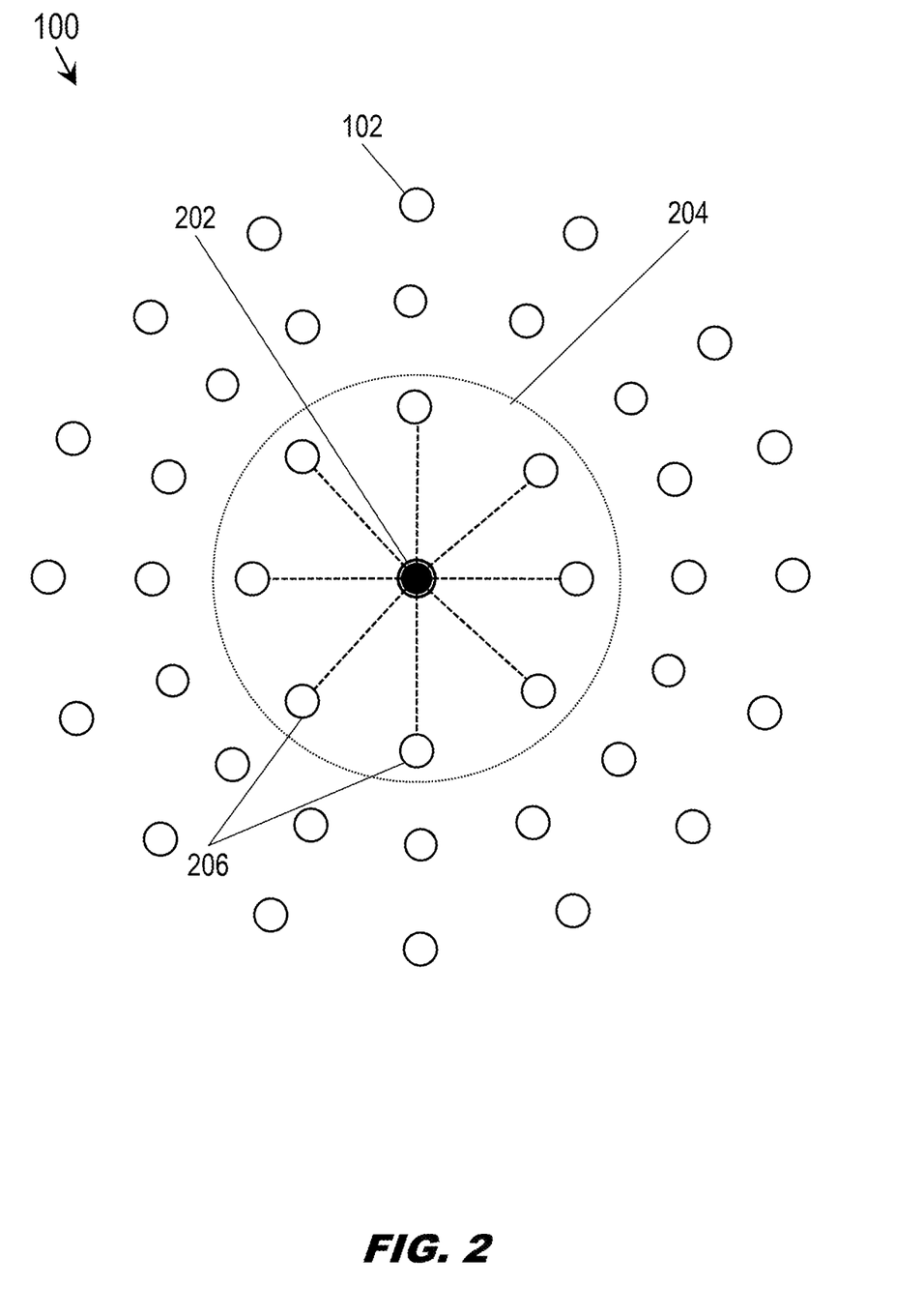
FIG. 2 is a diagrammatic illustration of clustering operations of the multi-node communications network of FIG. 1.

Referring also to FIG. 2, in embodiments the multi-node communications network 100 may organize (e.g., or reorganize) by constructing a dominating set (DS) of communications nodes 102. For example, the DS may include a subset of communications nodes 102 such that 1) the communications nodes comprising the DS are not neighbors to each other, i.e., are not communicatively coupled to each other and 2) the associated link statuses of the communications nodes comprising the DS can reach every communications node of the multi-node communications network 100.

In embodiments, the DS may comprise a set of clusterhead nodes 202 within the multi-node communications network 100, each clusterhead node 202 associated with a cluster 204 of neighbor nodes 206 to which the clusterhead node is directly communicatively connected. For example, based on traffic received from within the multi-node communications network 100, the clusterhead node 202 (e.g., via its controller (104, FIG. 1)) may transition to clusterhead node status, e.g., from gateway node status or ordinary node status. The state transitions of communications nodes 102 may be determined according to one or more passive clustering procedures and their associated state transition algorithms, e.g., efficient flooding with passive clustering (EFPC), zero overhead efficient flooding (ZOEF), or any other like passive clustering procedures.

In embodiments, the DS consisting of the minimally necessary number of nodes 202 for reaching every communications node of the multi-node communications network 100 may be known as an independent dominating set (IDS).

In embodiments, the cluster 204 may include any neighbor nodes 206 in direct communication with the clusterhead node 202 or that are two-hop neighbors to each other (e.g., two neighbor nodes 206 in communication with each other via the clusterhead node 202). In some embodiments, the size of the cluster 204 may be determined by the transmission range of the clusterhead node 202. It should be noted that the instant disclosure may use the term "neighbor node 206" interchangeably with "gateway node" or "ordinary node", as each neighbor node to a clusterhead node 202, e.g., the nodes in communication with the clusterhead node, may be either a gateway node or an ordinary node (or some other type of critical or noncritical node respectively), depending on the clustering structure and/or associated clustering statuses of the multi-node communications network 100).

In embodiments, the designation of the clusterhead node 202 (e.g., in addition to any other clusterhead nodes within the multi-node communications network 100) may be based on received traffic from its neighbor nodes 206. For example, hello messages or other network traffic received from a neighbor node 206 may indicate a status transition in the transmitting neighbor node (which may in turn be driven by, e.g., the addition to or the deletion from the multi-node communications network 100 of a communications node 102). This received status transition, or several received status transitions from multiple neighbor nodes 206, may cause the clusterhead node 202 to change its own node status. In some embodiments, the clusterhead node 202 may initiate a network restructuring and defining of the IDS via an initial flooding to all communications nodes 102 within the multi-node communications network 100 (e.g., according to one or more efficient flooding (EF) procedures for data packet flooding).

Embodiments of the inventive concepts disclosed herein are not limited to the clustering structure described above, but may be applicable to any other multi-node communications network 100 incorporating clusterhead nodes 202, as opposed to other communications nodes within the multi-node communications network. It is noted herein that the clustering structure (e.g., clustering hierarchy) of the present disclosure is not to be regarded as a limitation of the present disclosure, unless noted otherwise herein. In this regard, it is contemplated herein that any clustering hierarchy including two or more types/statuses of communication nodes 102 may be utilized to implement embodiments of the present disclosure.

Figure 3A:
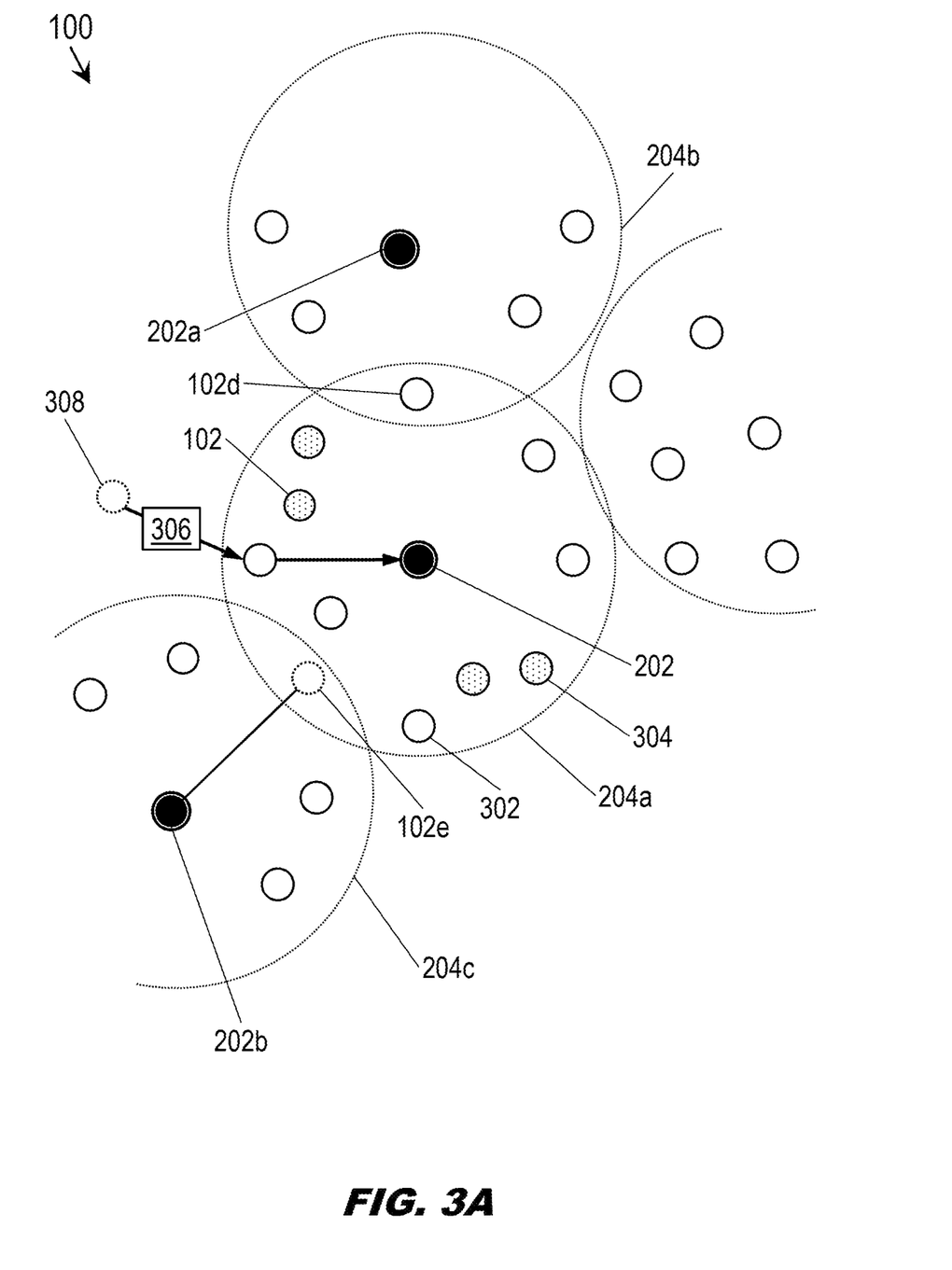
FIG. 3A is a diagrammatic illustration of a cluster of nodes within the multi-node communications network of FIG. 1.

Referring to FIG. 3A, the cluster 204a may be implemented and may function similarly to the cluster 204 of FIG. 2, except that the cluster 204a may acquire additional communications nodes 102 within the transmission range of the clusterhead node 202. For example, the cluster 204a may include, in addition to its clusterhead node 202, gateway nodes 302 and ordinary (e.g., noncritical) nodes 304. In embodiments, gateway nodes 302 may automatically relay any received data packets or messages unless otherwise precluded from doing to (e.g., via time-to-live (TTL) information contained within a data packet indicating that the packet is either not to be relayed or has already been relayed).

In embodiments, the communications nodes 102d-e may be located within the transmission range of more than one clusterhead node and may therefore choose a primary clusterhead and cluster. For example, the communications node 102d may be within range of clusterhead nodes 202, 202a (e.g., within clusters 204a, 204b) and may elect to join cluster 204a, with clusterhead node 202 as its primary clusterhead. Similarly, the communications node 102e may be within range of clusterhead nodes 202, 202b (e.g., within clusters 204a, 204c) but may elect to join cluster 204c, with clusterhead node 202b as its primary clusterhead.

In embodiments, the clusterhead node 202 may receive an MCI request packet 306, or a request for communications nodes 102 to forward their MCI data. For example, the MCI request packet 306 may originate at a source node 308 (e.g., command post; a communications node 102 external to the cluster 204a, but still within the multi-node communications network 100). In some embodiments, the MCI request packet 306 may be received by a gateway node 302 of the cluster 204a, and relayed by the gateway node to the clusterhead node 202.

Figure 3B:
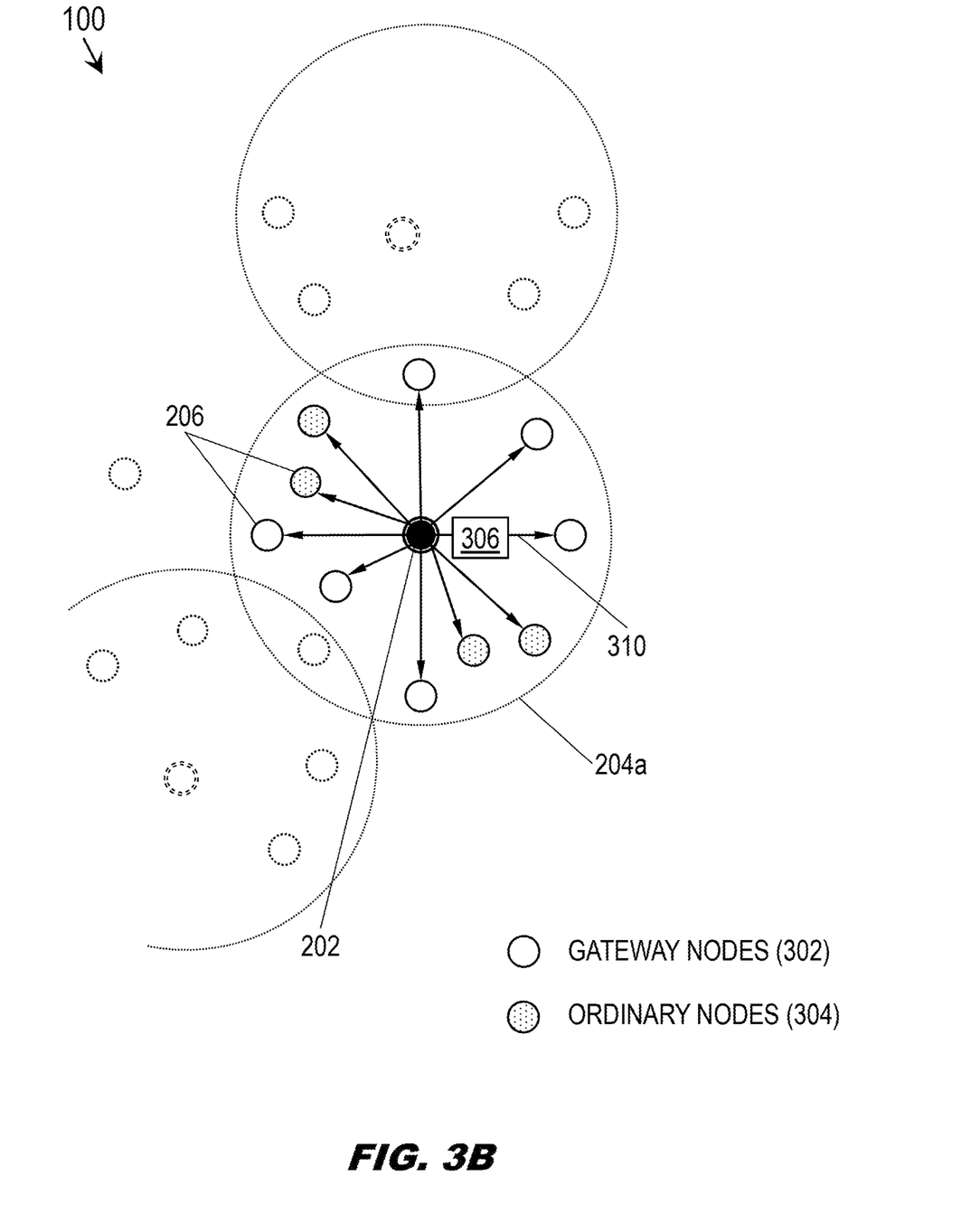
FIG. 3B is a diagrammatic illustration of mission-critical information (MCI) request packet distribution operations of the cluster of FIG. 3A.

Referring now to FIG. 3B, the cluster 204a is disclosed.

In embodiments, the clusterhead node 202 may receive the MCI request packet 306 and collect information from the neighbor nodes 206 of its cluster 204a, e.g., all communications nodes (102, FIG. 1) communicatively linked to, and hearing from, the clusterhead node 202. For example, the clusterhead node 202 may broadcast (310) the received MCI request packet 306 to one-hop neighbors on its local neighbor list, e.g., including gateway nodes 302 and ordinary nodes 304.

In some embodiments, the clusterhead node 202 may distribute the MCI request packet 306 throughout its cluster 204a via zero overhead efficient flooding (ZOEF), efficient packet flooding with passive clustering (EFPC), or any other appropriate packet flooding or packet broadcasting procedures or schemes.

In some embodiments, the MCI request packets 306 distributed by the clusterhead node 202 may include one or more requesting characteristics for identifying particular neighbor nodes 206 of the clusterhead node (e.g., gateway nodes 302 and ordinary nodes 304 of the cluster 204a) will be required to forward MCI data; any neighbor nodes not meeting these requesting characteristics may refrain from reporting in response to the MCI request packets 306.

Requesting characteristics may include, but are not limited to, clustering statuses (e.g., clusterhead nodes 202 vs. gateway nodes 302 vs. ordinary nodes 304), location (e.g., all communication nodes 102 within a specified geofenced area), altitude (e.g., all communication nodes 102 above/below a specified altitude), speed, heading, mobile or immobile (e.g., only mobile communication nodes 102), above/below a specified rank, or distance above/below a specified threshold distance from the source node 308. By way of another example, a requesting characteristic may be targeted towards communication nodes 102 which have changed their location more than a threshold amount since the last time they reported MCI data, such that only communication nodes 102 which have changed position more than a threshold distance may be required to report new MCI data.

It is noted herein that including requesting characteristics within the MCI request packets 306 may reduce the frequency of MCI reporting, and may therefore reduce overall traffic within the multi-node communication network 100. Additionally, due to the fact that not every single communication node 102 may be required to respond to each MCI request packet (dependent upon requesting characteristics), the overall traffic of the multi-node communication network 100 may not be directly proportional to the size of the network, thereby preventing threat receivers from determining and/or estimating the size of the network by monitoring network traffic.

In some embodiments, the distribution of MCI request packets 306 by the clusterhead node 202 may form or reconfigure a clustering structure within the cluster 204a, or more broadly within the multi-node communications network 100.

Figure 3C:
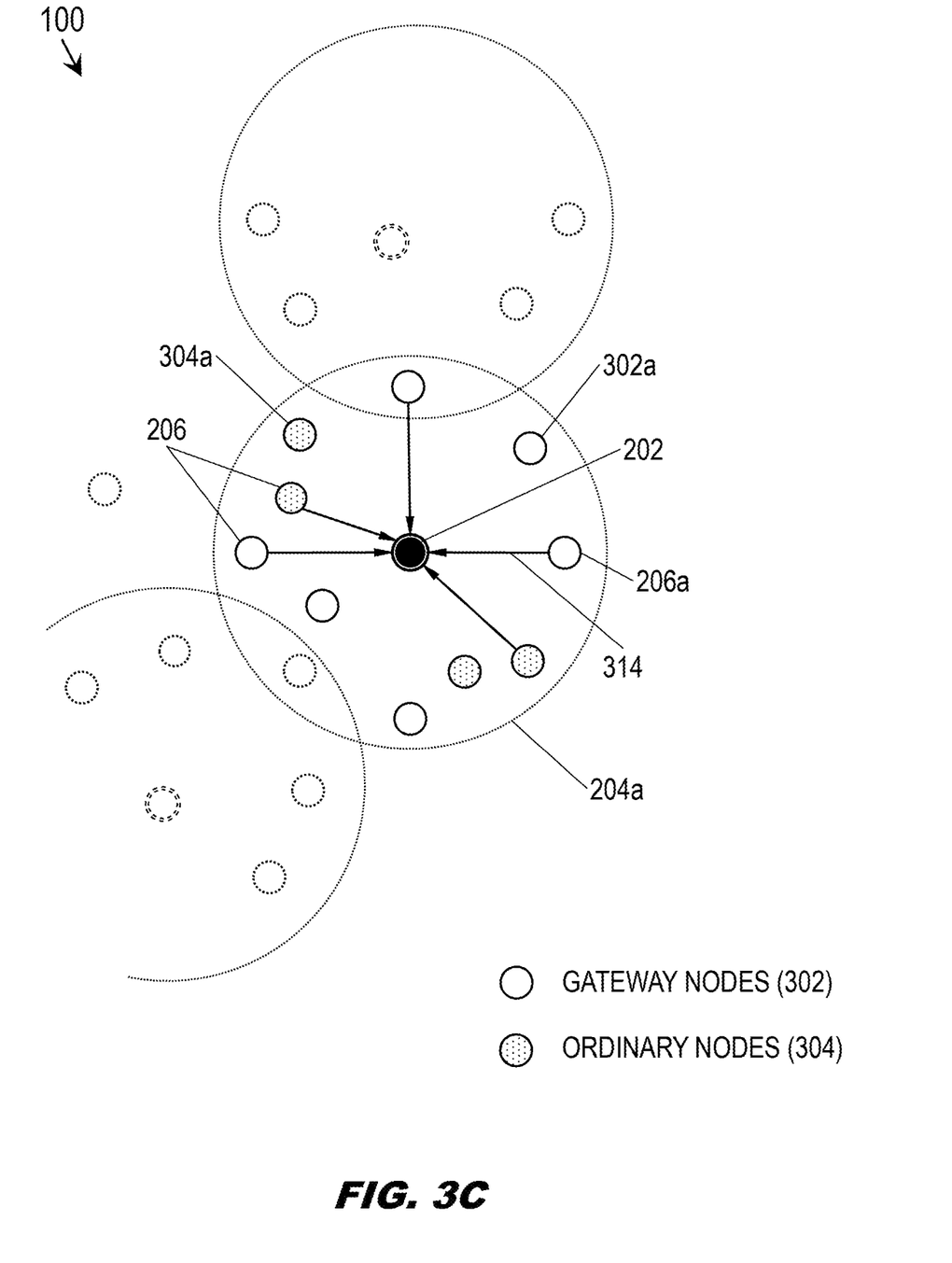
FIG. 3C is a diagrammatic illustration of mission-critical information (MCI) report packet collection operations of the cluster of FIG. 3A.

Referring now to FIG. 3C, the cluster 204a is disclosed.

In embodiments, after distribution of the MCI request packets (306/310, FIG. 2B) throughout the cluster 204a, the clusterhead node 202 may wait for responses throughout a first time interval $T_1$. For example, during the first time interval $T_1$, the clusterhead node 202 may collect MCI report packets (314) from its neighbor nodes 206, e.g., gateway nodes 302 and/or ordinary nodes 304, each MCI report packet including MCI information particular to the transmitting neighbor node. MCI report packets 314 may further include unique identifiers particular to the transmitting neighbor node 206. As noted previously herein, unique identifiers may include, but are not limited to, physical addresses (e.g., MAC addresses), network addresses (e.g., IP addresses), and the like.

Dependent upon characteristics of the multi-node communication network 100 (e.g., topology, traffic, noise, jamming) and/or characteristics of the surrounding environment (e.g., weather conditions, terrestrial interference), one or more MCI request packets 306 transmitted by the clusterhead node 202 and/or one or more MCI report packets transmitted by the group of neighbor nodes 206 may not be successfully delivered. In this regard, throughout the first time interval $T_1$, the clusterhead node 202 may only receive MCI report packets 314 from a subset of the larger group of neighbor nodes. For example, as shown in FIG. 3C, the clusterhead node 202 may receive MCI report packets 314 from some neighbor nodes 206, but not from other gateway nodes (302a) or ordinary nodes (304a).

In embodiments, the controller (104, FIG. 1) of the clusterhead node 202 may be configured to keep track of each neighbor node 206 from which it has received an MCI report packet 314. In this regard, the clusterhead node 202 may generate a member list including each neighbor node 206 (e.g., gateway node 302, ordinary node 304) which previously transmitted an MCI report packet 314 to the clusterhead node 202. Such gateway nodes 302 and ordinary nodes 304 may be referred to as acknowledged neighbor nodes (206a). In embodiments, the member list may include a list of unique identifiers particular to each acknowledged neighbor node 206a.

Upon expiration of the first time interval $T_1$ (e.g., after collecting MCI report packets (314, FIG. 3C) throughout the first time interval $T_1$), the clusterhead node 202 may rebroadcast (e.g., retransmit) the MCI request packet 306a with a collected member list.

Figure 3D:
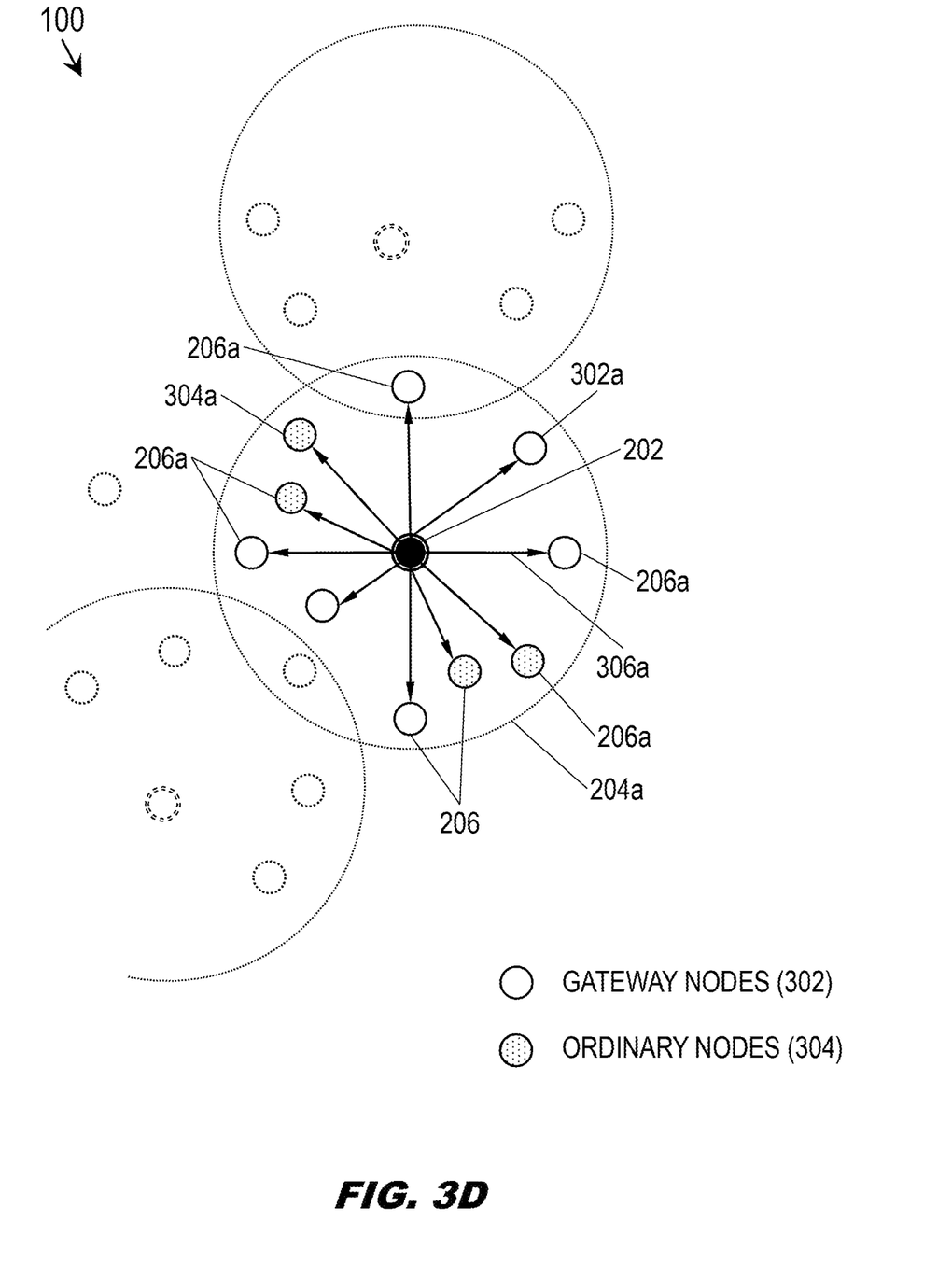
FIG. 3D is a diagrammatic illustration of mission-critical information (MCI) report packet rebroadcast and recollection operations of the cluster of FIG. 3A.

Referring now to FIG. 3D, the cluster 204a is disclosed.

In embodiments, the clusterhead node 202 may rebroadcast the MCI request packet 306a (e.g., including a member list) to the neighbor nodes 206 of the cluster 204. For example, any neighbor nodes 206 (e.g., gateway nodes 302, ordinary nodes 304) receiving the MCI request packet 306a may review the neighbor list and, if the neighbor node is on the member list (e.g., if the neighbor node is an acknowledged neighbor node 206a), may take no further action (e.g., as no further action may be required, the neighbor node having already forwarded its current MCI data to the clusterhead node 202). In some embodiments, the clusterhead node 202 may configure the rebroadcast MCI request packet 306a so that it is not forwarded or relayed more than once (e.g., based on a unique source identifier and/or sequence number).

In embodiments, the clusterhead node 202 may wait for a second time interval $T_2$ for responses to the rebroadcast MCI request packet 306a, the second time interval first-time $T_2$ shorter than the first time interval $T_1$. If, during the second time interval $T_2$, the clusterhead node 202 receives additional MCI report packets 314 from additional unacknowledged neighbor nodes 206 (e.g., gateway nodes 302a and ordinary nodes 304a) of the cluster 204a, the clusterhead node 202 may rebroadcast the MCI request packet 306a once more (e.g., with an updated member list to indicate MCI report packets 314 received during the second time interval), waiting for a third time interval $T_3$ shorter than the second time interval $T_2$. The clusterhead node 202 may continue rebroadcasting the MCI request packet 306a as long as MCI report packets 314 continue to be transmitted in response, for increasingly shorter time intervals $T_N$.

Figure 3E:
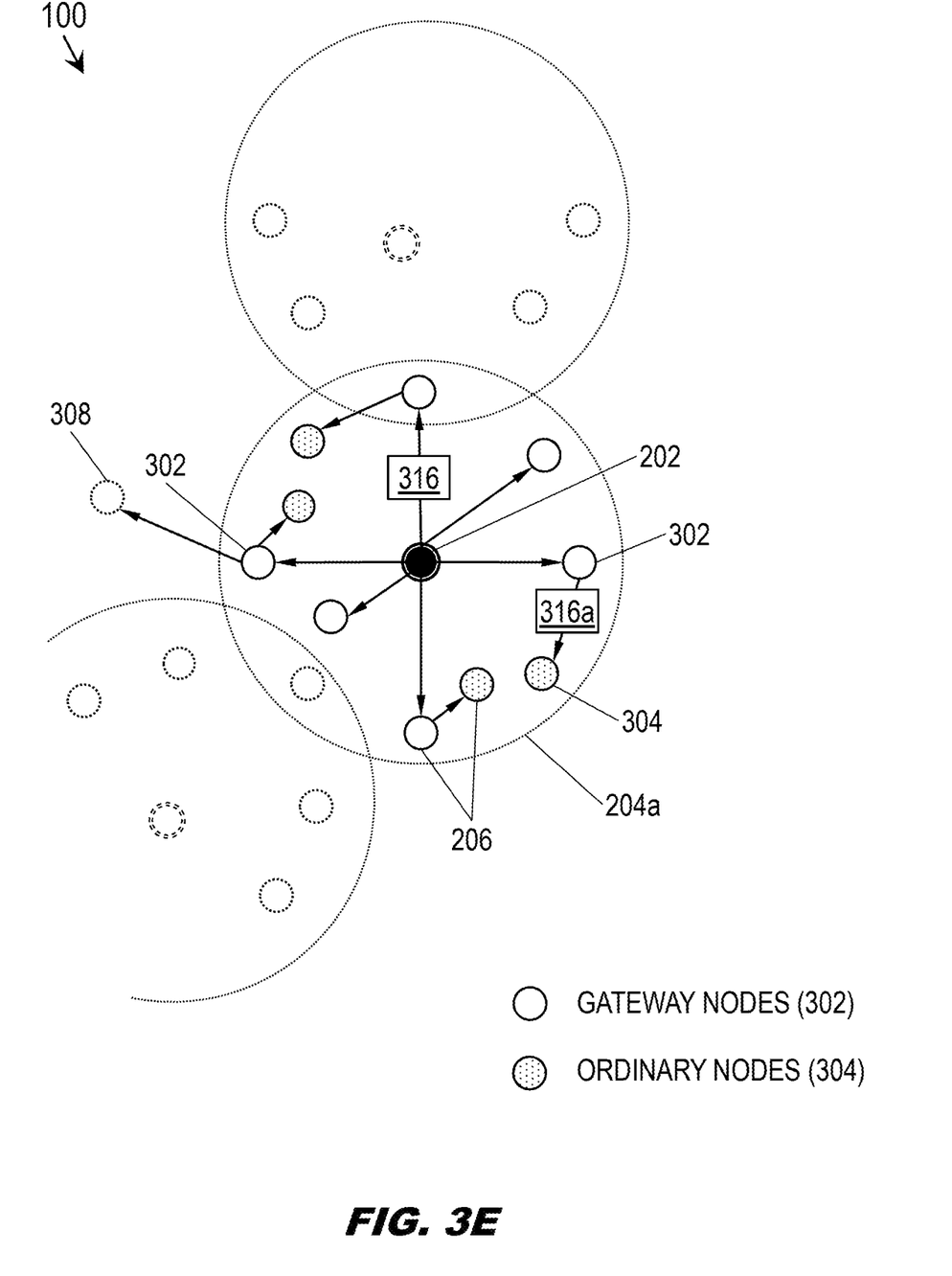
FIG. 3E is a diagrammatic illustration of mission-critical information (MCI) publish packet transmission operations of the cluster of FIG. 3A.

Referring now to FIG. 3E, the cluster 204a is shown.

In embodiments, if, during the most recently concluded time interval $T_N$, no MCI report packets (314, FIG. 3C) are received by the clusterhead node 202, the clusterhead node may cease rebroadcasting and transmit an MCI publish packet 316 (e.g., to the source node 308 from which the MCI request packet 306 originated, via the gateway node 302). For example, the MCI publish packet 316 may include any MCI data and unique identifiers associated with each reporting neighbor node 206 (e.g., with each MCI report packet 314 sent by a neighbor node 206). Additionally, or alternatively, the clusterhead node 202 may broadcast the MCI publish packet 316 to every communication node (102, FIG. 1) of the multi-node communications network (100, FIG. 1), e.g., via any appropriate packet broadcasting or packet flooding procedure or scheme (e.g., EFPC, ZOEF, and the like). For example, the clusterhead node 202 may distribute the MCI publish packet 316 to its one-hop neighbor nodes (206); if these one-hop neighbor nodes 206 include gateway nodes 302, the gateway nodes may relay the MCI publish packet (316a) to their own one-hop neighbor nodes (e.g., ordinary nodes 304).

Figure 4A:
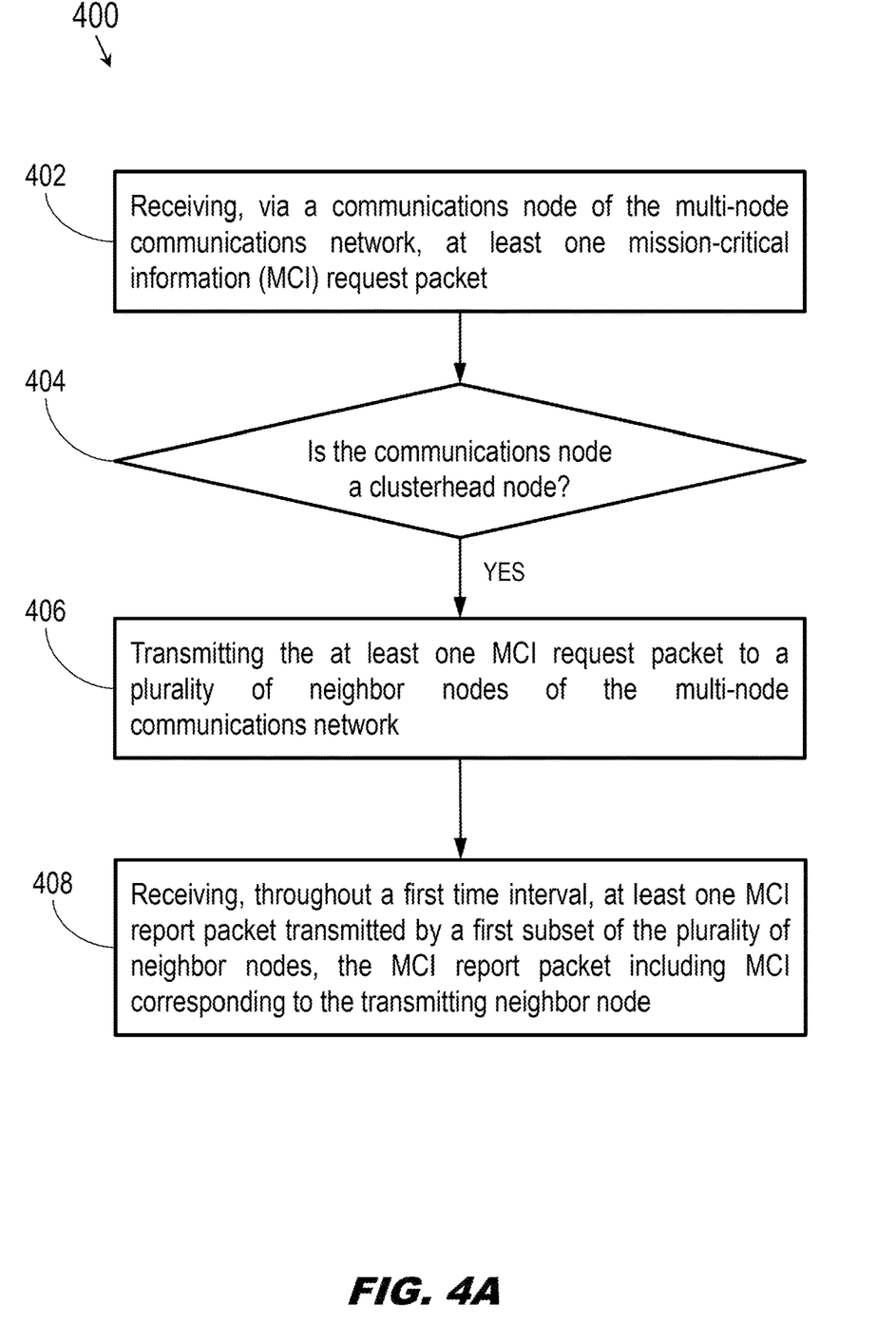
FIGS. 4A and 4B are process flow diagrams illustrating a method for efficient collection and distribution of MCI according to example embodiments of this disclosure.

Referring now to FIG. 4A, the method 400 may be implemented by the multi-node communications network 100 of FIGS. 1 through 3F and may include the following steps.

At a step 402, a communications node of the multi-node communications network receives an MCI request packet. For example, the MCI request packet may be received from a source node within the multi-node communications network (e.g., or forwarded by a gateway node as noted below).

At a step 404, the communications node determines whether it is a clusterhead node. For example, if the communications node is not a clusterhead node the MCI request packet may be ignored (or, if the communications node is a gateway node, the communications node may relay the MCI request packet, e.g., to its primary clusterhead node).

At a step 406, if the communications node is a clusterhead node, the communications node transmits the MCI request packet to its neighbor nodes, e.g., the neighbor nodes of its cluster. For example, the communications node may incorporate EFPC, ZOEF, or any other appropriate packet flooding or packet broadcasting scheme in transmitting the MCI request packet.

At a step 408, the clusterhead node receives (e.g., while waiting through a first time interval $T_1$) MCI report packets from a subset of the neighbor nodes, each MCI report packet including MCI data (e.g., and a unique identifier) of the transmitting neighbor node.

Figure 4B:
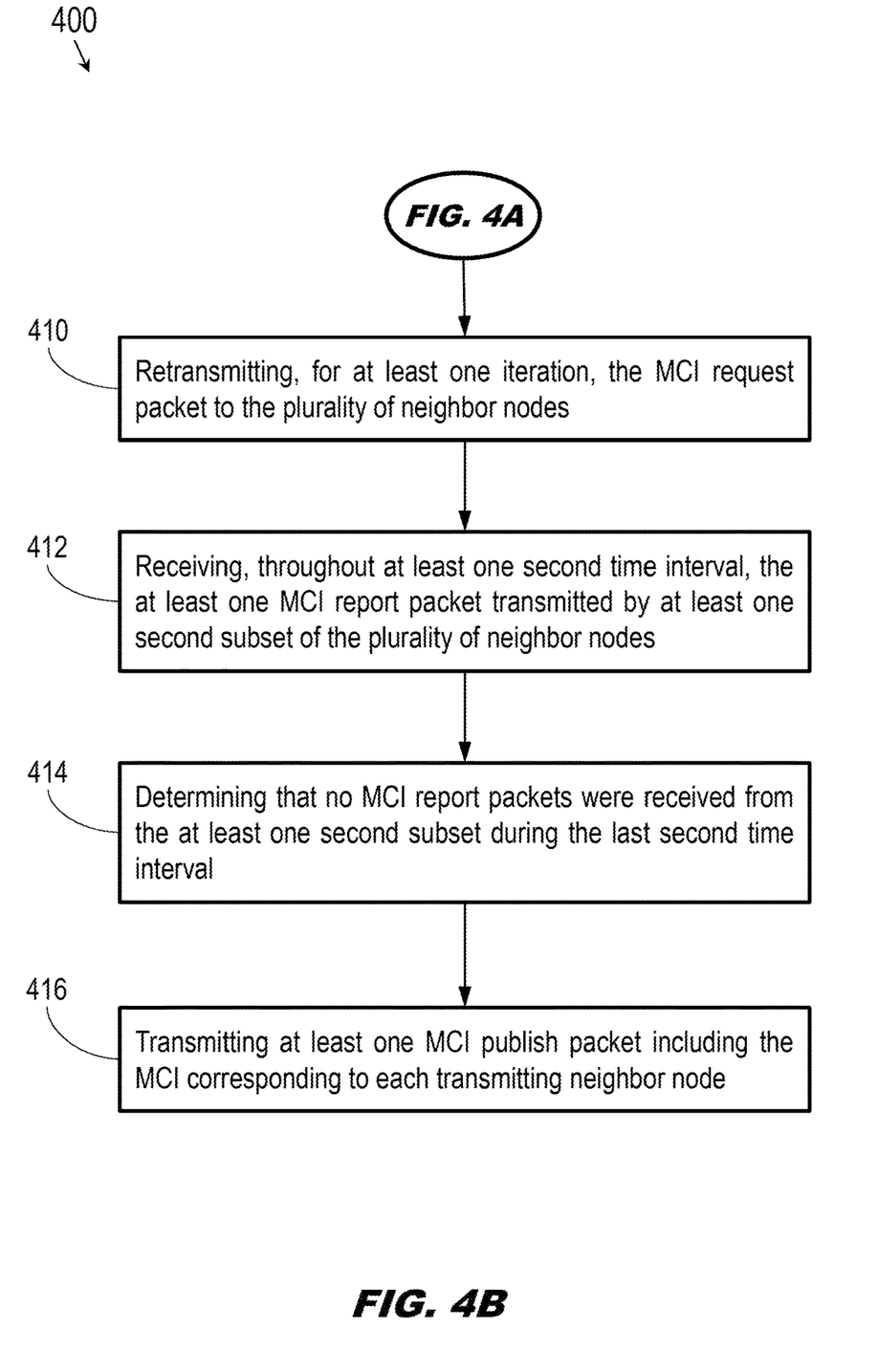

Referring also to FIG. 4B, at a step 410, the clusterhead node retransmits the MCI request packet to its neighbor nodes and waits for a further time interval $T_2$ ($T_2<T_1$) for MCI report packets. For example, the clusterhead node may rebroadcast the MCI request packet through N iterations, where for every M from 1 to N, the immediately subsequent time interval $T_{(M+1)}$ is shorter than the current time interval $T_M$. For example, the clusterhead node rebroadcasts the MCI request packet with a current member list updated to include identifying information of the acknowledged neighbor nodes that have already submitted MCI report packets. In some embodiments, the clusterhead node rebroadcasts the MCI request packets including requesting characteristics that indicate which neighbor nodes should or should not transmit MCI report packets.

At a step 412, the clusterhead node receives MCI report packets throughout the second time interval $T_2$ from a second subset of the neighbor nodes. In some embodiments, the clusterhead node may continue rebroadcasting the MCI request packet to its neighbor nodes and waiting through incrementally shorter time intervals for MCI report packets in response. In some embodiments, the clusterhead node receives MCI report packets from unacknowledged neighbor nodes not already included on the member list, or from neighbor nodes that meet or fulfill the requesting characteristics.

At a step 414, the clusterhead node detects no new MCI report packets received from its neighbor nodes during the most recent time interval $T_N$.

At a step 416, the clusterhead node transmits an MCI publish packet including the MCI received from each transmitting neighbor node. For example, the clusterhead node may unicast the MCI publish packet to the source node from which the MCI request packet originated, or broadcast the MCI publish packet throughout the multi-node communications network via the neighbor nodes of its cluster (e.g., according to any appropriate packet broadcasting or packet flooding scheme).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, the communications node comprising:
    a communications interface;
    a controller communicatively coupled to the communications interface, the controller configured to:
        receive at least one mission-critical information (MCI) request packet via the communications interface; and,
        if the communications node is associated with a clusterhead node status:
            transmit the at least one MCI request packet to a plurality of neighbor nodes of the multi-node communications network via the communications interface;
            receive, throughout a first time interval, at least one MCI report packet transmitted by a first subset of the plurality of neighbor nodes, the MCI report packet including MCI corresponding to the transmitting neighbor node;
            retransmit for at least one iteration the MCI request packet to the plurality of neighbor nodes via the communications interface;
            receive, throughout at least one second time interval, the at least one MCI report packet transmitted by at least one second subset of the plurality of neighbor nodes;
            determine that no MCI report packets were received from the at least one second subset during the most recent second time interval; and
            transmitting, via the communications interface, at least one MCI publish packet including the MCI corresponding to each transmitting neighbor node.

2. The communications node of claim 1, wherein the controller is configured to:
    retransmit, for N iterations, the MCI request packet to the plurality of neighbor nodes via the communications interface, wherein:
        M, N are integers such that $1 \le M \le N$;
        an initial second time interval is shorter than the first time interval;
        each $(M+1)^{th}$ second time interval is shorter than each $M^{th}$ second time interval; and
        no MCI report packets are received from the at least one second subset during the $N^{th}$ second time interval.

3. The communications node of claim 1, wherein:
    the at least one MCI request packet includes at least one member list of the transmitting neighbor nodes;
    and wherein
    the controller is configured to receive, throughout at least one second time interval, the at least one MCI report packet transmitted by at least one second subset of the plurality of neighbor nodes not included in the at least one member list.

4. The communications node of claim 1, wherein:
    the at least one MCI request packet includes one or more requesting characteristics;
    and wherein
    the controller is configured to receive, throughout at least one second time interval, the at least one MCI report packet transmitted by at least one second subset of the plurality of neighbor nodes fulfilling the one or more requesting characteristics.

5. The communications node of claim 1, wherein the at least one MCI report packet includes a unique identifier of the transmitting neighbor node, the unique identifier including at least one of a physical address and a network address.

6. The communications node of claim 1, wherein:
the clusterhead node is one of a dominating set of clusterhead nodes of the multi-node communications network;
and
the plurality of neighbor nodes is associated with a clustering structure of neighbor nodes reporting to the communications node.

7. The communications node of claim 1, further comprising:
a memory communicatively coupled to the processor and configured to store a local list of the plurality of neighbor nodes.

8. The communications node of claim 1, wherein the controller is configured to:
receive the at least one mission-critical information (MCI) request packet from a source node of the multi-node communications network;
and
unicast the at least one MCI publish packet to the source node.

9. The communications node of claim 1, wherein the controller is configured to broadcast the at least one MCI publish packet to the plurality of neighbor nodes according to at least one packet broadcasting protocol.

10. A method for efficient collection and distribution of mission critical information (MCI), throughout a multi-node communications network, the method comprising:
receiving, via a communications node of the multi-node communications network, at least one mission-critical information (MCI) request packet;
and,
if the communications node is associated with a clusterhead node status:
transmitting the at least one MCI request packet to a plurality of neighbor nodes of the multi-node communications network;
receiving, throughout a first time interval, at least one MCI report packet transmitted by a first subset of the plurality of neighbor nodes, the MCI report packet including MCI corresponding to the transmitting neighbor node;
retransmitting, for at least one iteration, the MCI request packet to the plurality of neighbor nodes;
receiving, throughout at least one second time interval, the at least one MCI report packet transmitted by at least one second subset of the plurality of neighbor nodes;
determining that no MCI report packets were received from the at least one second subset during the most recent second time interval;
and
transmitting at least one MCI publish packet including the MCI corresponding to each transmitting neighbor node.

11. The method of claim 10, wherein:
receiving, via a communications node of the multi-node communications network, at least one mission-critical information (MCI) request packet includes receiving the MCI request packet from a source node of the multi-node communications network;
and
transmitting at least one MCI publish packet including the MCI corresponding to each transmitting neighbor node includes unicasting the MCI publish packet to the source node.

12. The method of claim 10, wherein transmitting at least one MCI publish packet including the MCI corresponding to each transmitting neighbor node includes:
transmitting the MCI publish packet to the plurality of neighbor nodes according to at least one packet broadcasting procedure.

13. The method of claim 10, wherein:
retransmitting, for at least one iteration, the MCI request packet to the plurality of neighbor nodes includes:
retransmitting the MCI request packet to the plurality of neighbor nodes for N iterations, wherein:
M, N are integers such that $1 \leq M \leq N$;
an initial second time interval is shorter than the first time interval;
and
each $(M+1)^{th}$ second time interval is shorter than each $M^{th}$ second time interval;
and
determining that no MCI report packets were received from the at least one second subset during the most recent second time interval includes determining that no MCI report packets were received from the at least one second subset during the $N^{th}$ second time interval.

14. The method of claim 10, wherein:
retransmitting, for at least one iteration, the MCI request packet to the plurality of neighbor nodes includes retransmitting the MCI request packet including at least one member list of the transmitting neighbor nodes;
and
receiving, throughout at least one second time interval, the at least one MCI report packet transmitted by at least one second subset of the plurality of neighbor nodes includes receiving the at least one MCI report packet transmitted by at least one second subset of the plurality of neighbor nodes not included in the at least one member list.

15. The method of claim 10, wherein:
retransmitting, for at least one iteration, the MCI request packet to the plurality of neighbor nodes includes retransmitting the MCI request packet including one or more requesting characteristics;
and
receiving, throughout at least one second time interval, the at least one MCI report packet transmitted by at least one second subset of the plurality of neighbor nodes includes receiving the at least one MCI report packet transmitted by at least one second subset of the plurality of neighbor nodes fulfilling the one or more requesting characteristics.

* * * * *